US008625952B2

(12) United States Patent
Hernandez Quintana et al.

(10) Patent No.: US 8,625,952 B2
(45) Date of Patent: Jan. 7, 2014

(54) FIBER OPTIC CABLE MOUNTING ADAPTERS, AND RELATED FIBER OPTIC CABLE ASSEMBLIES AND METHODS

(75) Inventors: Jose Manuel Hernandez Quintana, Tamaulipas (MX); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 287 days.

(21) Appl. No.: 13/181,840

(22) Filed: Jul. 13, 2011

(65) Prior Publication Data

US 2013/0016951 A1 Jan. 17, 2013

(51) Int. Cl.
*G02B 6/00* (2006.01)
(52) U.S. Cl.
USPC .............. 385/136; 385/135; 385/137
(58) Field of Classification Search
USPC .................................. 385/136, 137
See application file for complete search history.

(56) References Cited

U.S. PATENT DOCUMENTS

| 4,898,542 | A | * | 2/1990 | Jones, Jr. | 439/371 |
|---|---|---|---|---|---|
| 5,231,688 | A | | 7/1993 | Zimmer | 385/139 |
| 5,528,718 | A | * | 6/1996 | Ray et al. | 385/136 |
| 6,623,173 | B1 | | 9/2003 | Grois et al. | 385/76 |
| 7,330,629 | B2 | * | 2/2008 | Cooke et al. | 385/136 |
| 7,630,606 | B2 | | 12/2009 | Lu et al. | 385/100 |
| 7,756,374 | B2 | | 7/2010 | Cody et al. | 385/114 |
| 8,218,936 | B2 | * | 7/2012 | Sek | 385/136 |
| 2002/0064364 | A1 | | 5/2002 | Battey et al. | 385/136 |
| 2003/0063888 | A1 | * | 4/2003 | Sahlin et al. | 385/134 |
| 2007/0047897 | A1 | * | 3/2007 | Cooke et al. | 385/136 |
| 2009/0060431 | A1 | | 3/2009 | Lu | 385/114 |
| 2009/0103881 | A1 | * | 4/2009 | Gonzalez et al. | 385/137 |
| 2009/0148120 | A1 | | 6/2009 | Reagan et al. | 385/135 |
| 2010/0040338 | A1 | * | 2/2010 | Sek | 385/134 |
| 2010/0150504 | A1 | | 6/2010 | Allen et al. | 385/76 |
| 2010/0215330 | A1 | * | 8/2010 | Sokolowski et al. | 385/136 |
| 2011/0268403 | A1 | | 11/2011 | Ciechomski et al. | 385/134 |
| 2012/0281959 | A1 | * | 11/2012 | Kubinski et al. | 385/139 |
| 2013/0016951 | A1 | * | 1/2013 | Hernandez Quintana et al. | 385/135 |

FOREIGN PATENT DOCUMENTS

DE 202011004313 U1 6/2011 ............... G02B 6/44

(Continued)

OTHER PUBLICATIONS

Patent Cooperation Treaty, International Search Report, Dec. 10, 2012, 7 pages.

*Primary Examiner* — Rhonda Peace

(57) ABSTRACT

Fiber optic cable mounting adapters and related fiber optic cable assemblies and methods for attaching an external mounting device to the fiber optic cable are disclosed. The fiber optic mounting adapters can be configured to be secured to a portion of a fiber optic cable. The fiber optic mounting adapters can also be configured to be secured to external mounting devices compatible to be secured to fiber optic equipment, to secure the fiber optic mounting adapter, and in turn the fiber optic cable, to the fiber optic equipment. Securing a portion of a fiber optic cable can reduce or prevent bending strain from being propagated along the fiber optic cable. Undesired bending strain of a fiber optic cable can cause undesired optical attenuation. Bending strain can also risk damaging optical fibers, such as furcated legs, exposed from the end portion of the fiber optic cable.

30 Claims, 16 Drawing Sheets

(56) References Cited

FOREIGN PATENT DOCUMENTS

| | | | | |
|---|---|---|---|---|
| EP | 0903595 | 3/1999 | ............... | G02B 6/00 |
| EP | 2154556 A1 | 2/2010 | ............... | G02B 6/44 |
| GB | 2312758 A | 11/1997 | ............... | G02B 6/36 |
| JP | 7-067229 A | 3/1995 | ............... | H02G 3/04 |
| JP | 7-336066 A | 12/1995 | ............... | H05K 7/00 |
| JP | 9-294322 A | 11/1997 | ............... | H02G 3/26 |

\* cited by examiner

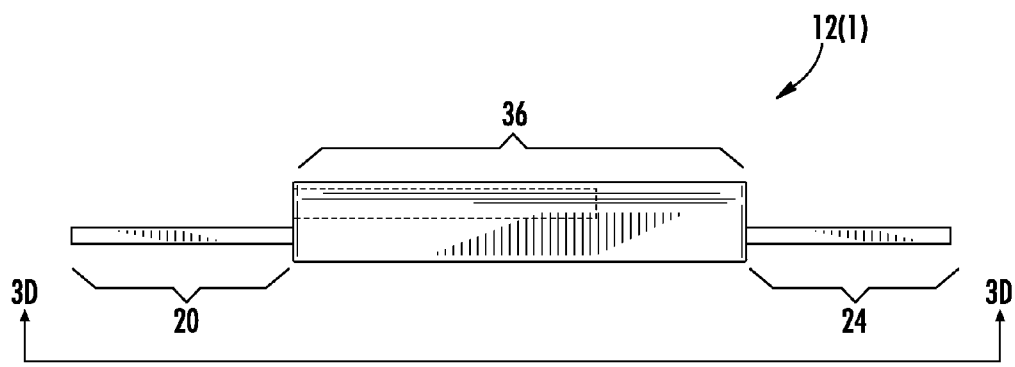
FIG. 3C
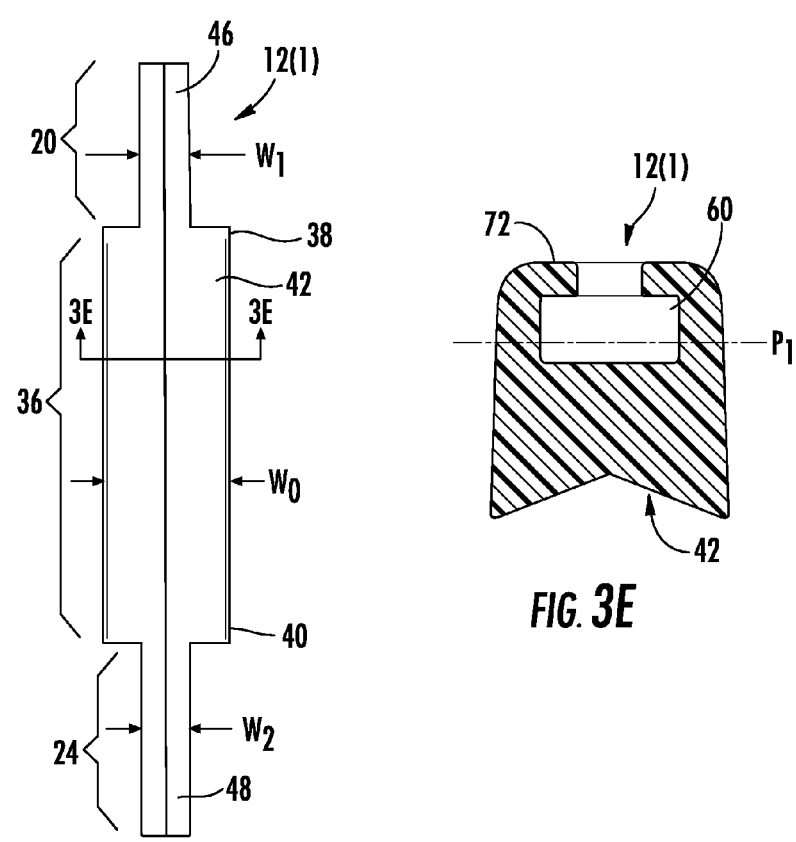
FIG. 3E
FIG. 3D

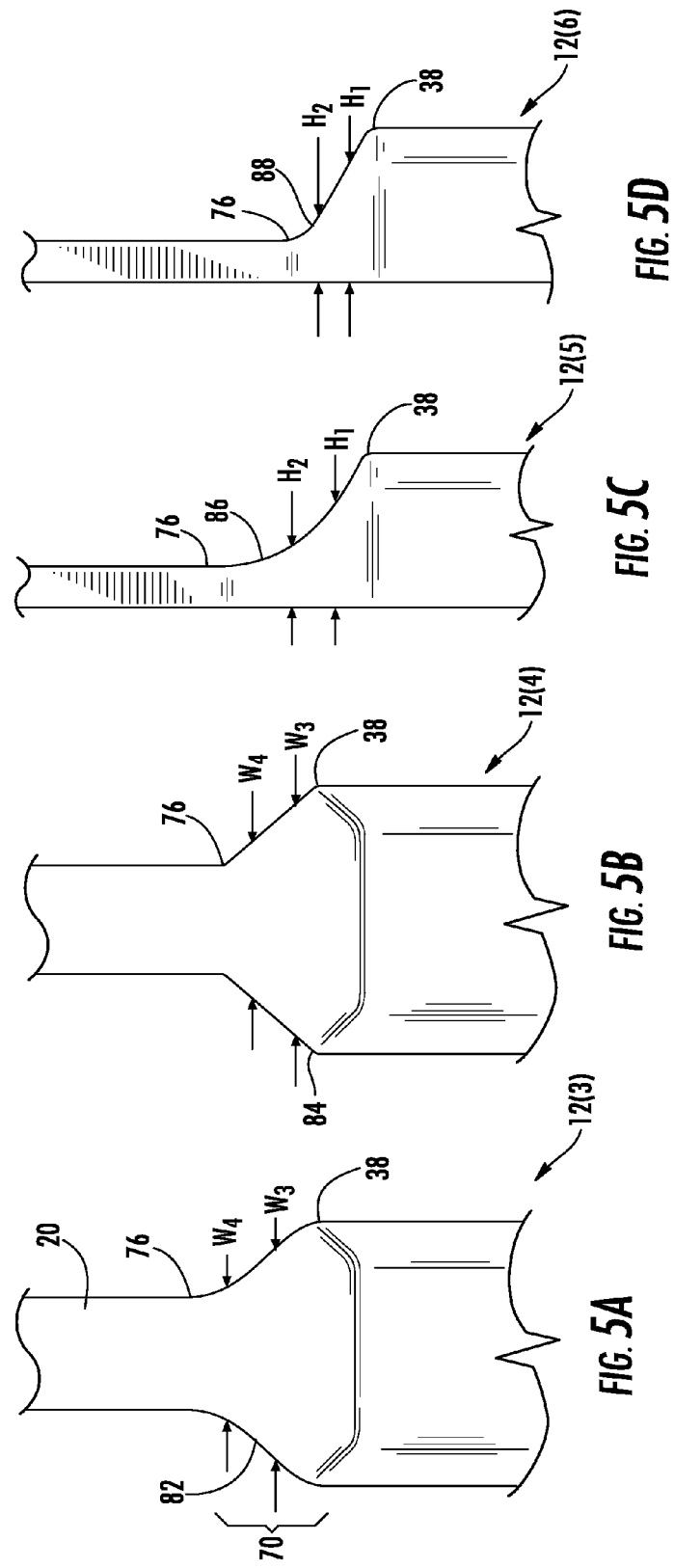

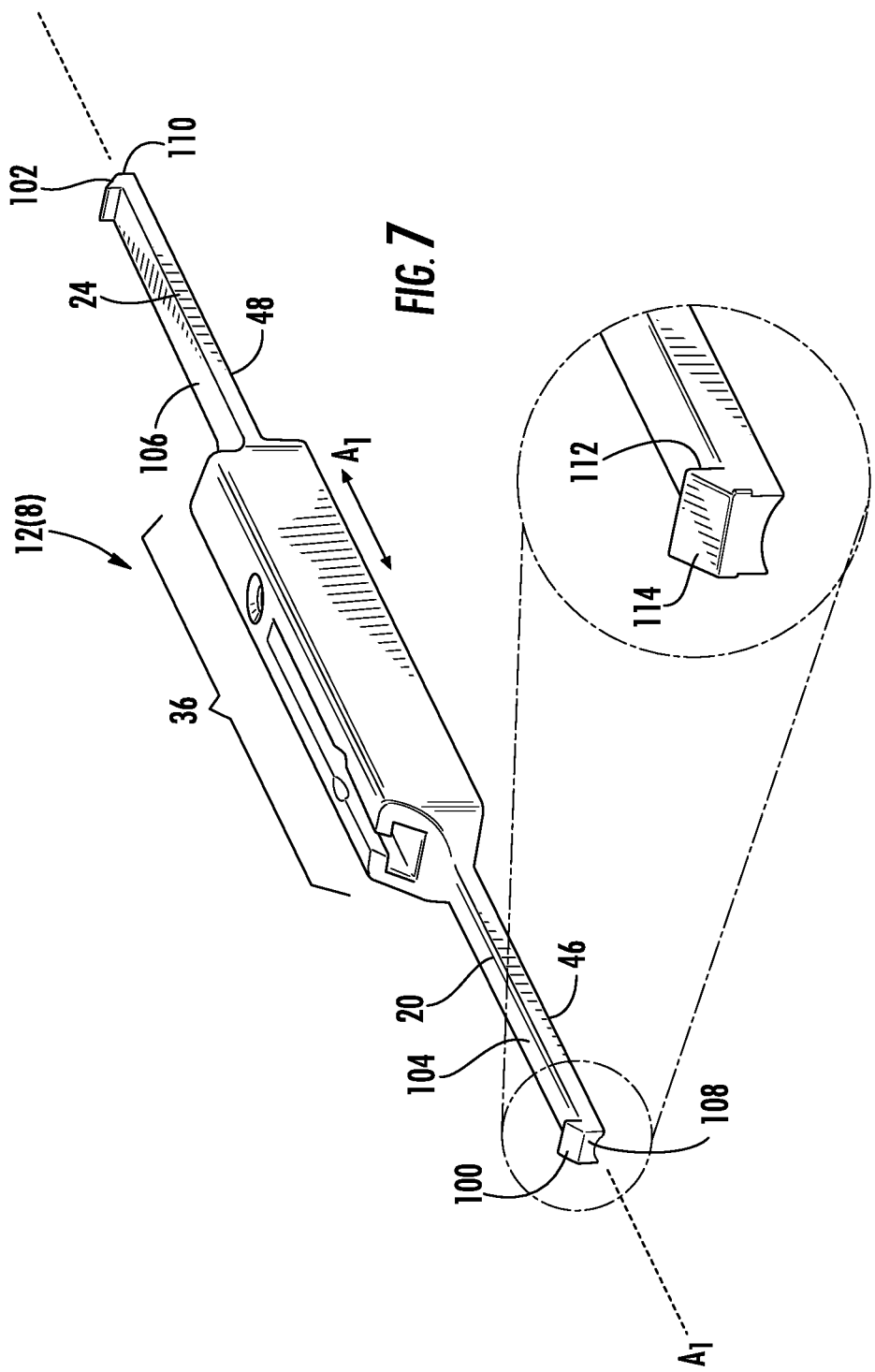

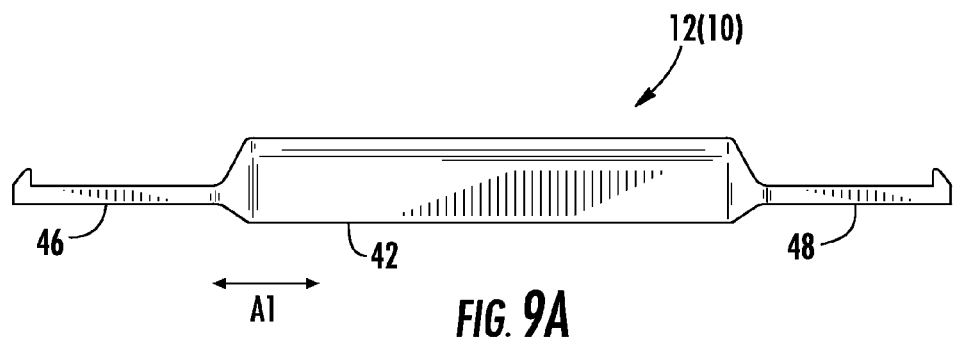
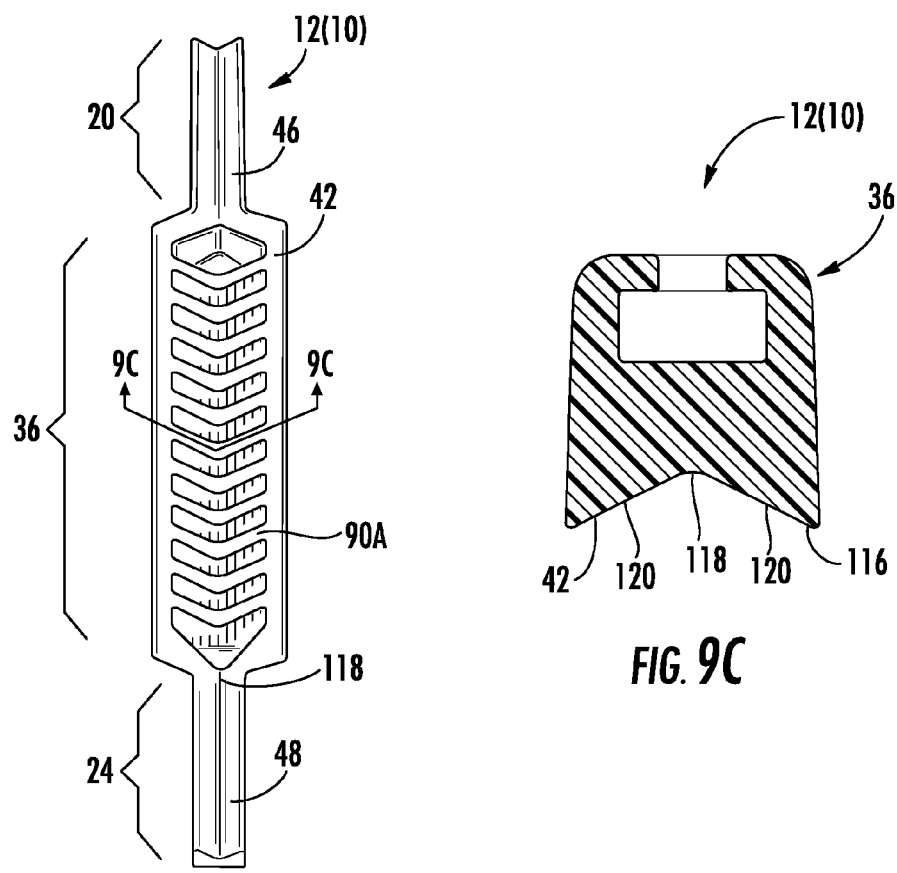

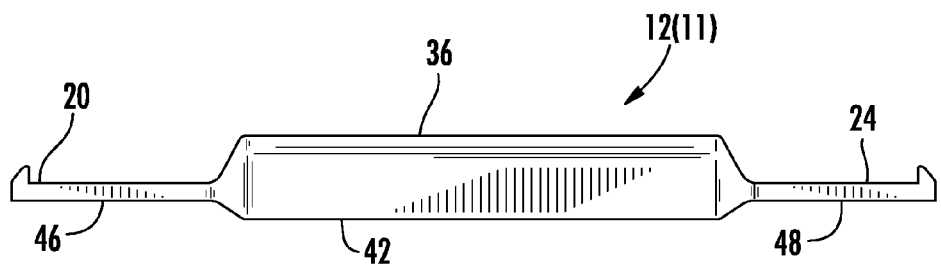
FIG. 10A
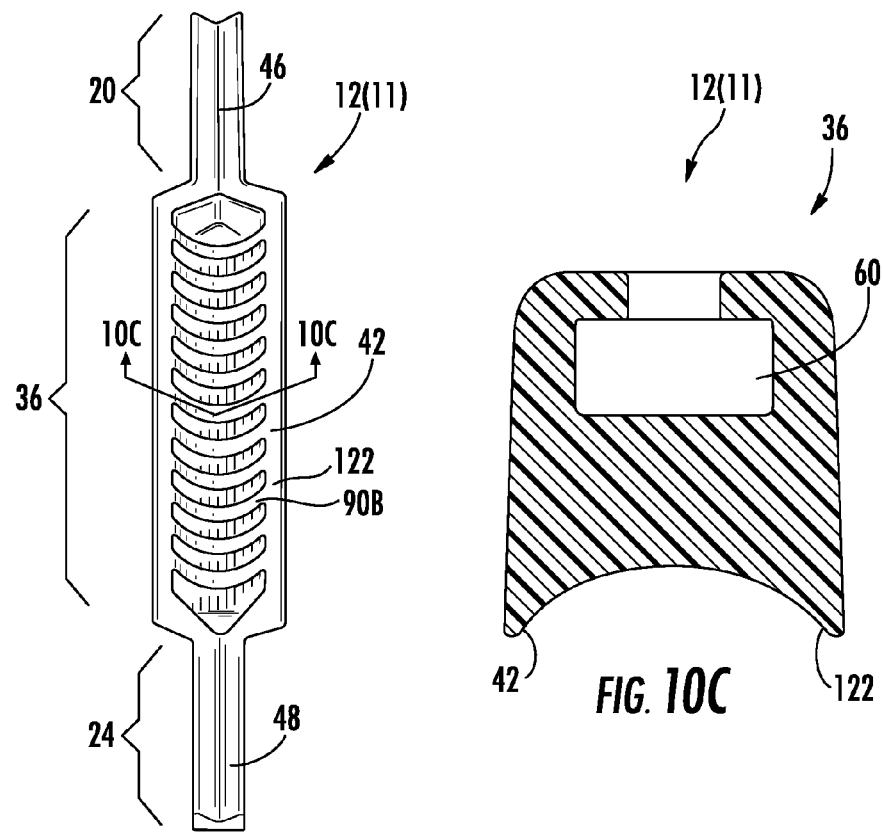
FIG. 10B
FIG. 10C

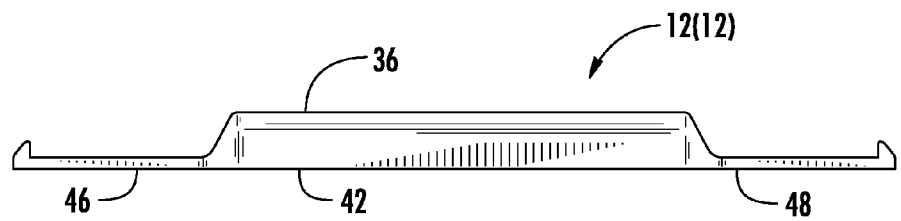
FIG. 11A
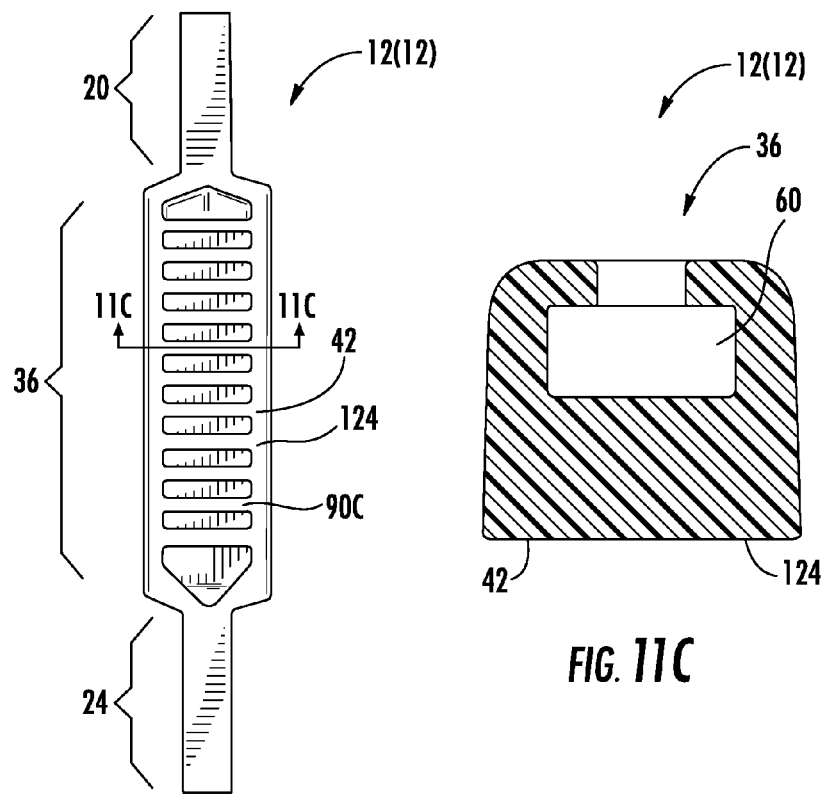
FIG. 11B
FIG. 11C

US 8,625,952 B2

FIBER OPTIC CABLE MOUNTING ADAPTERS, AND RELATED FIBER OPTIC CABLE ASSEMBLIES AND METHODS

BACKGROUND

1. Field of the Disclosure

The technology of the disclosure relates to fiber optic cable mounting adapters and related assemblies and methods for attaching an external mounting device to a fiber optic cable. The external mounting device may be used to secure the fiber optic cable to fiber optic equipment.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. Typically, the interconnections use connectors and ports at patch panels for making interconnections. Near these interconnection locations it is typically desired to secure the cable assemblies so that pulling and bending forces are not transferred to the connector ports since these forces can adversely affect optical signal transmission.

Fiber optic cables, such as trunk cables, may extend large distances between fiber optic equipment and the connector ports in the network. Such fiber optic cable routing can involve bending the fiber optic cable, which imposes bending strain on the fiber optic cable. Fiber optic cables are designed to tolerate a certain amount of bending strain without damaging the optical fibers disposed inside the fiber optic cable. Materials of the cable jacket and the inclusion of strength members inside the cable jacket can be selected to achieve the desired strain tolerance of a fiber optic cable. Even so, extreme bending strain beyond designed limits can risk damaging optical fibers disposed inside the fiber optic cable. Further, bending of the fiber optic cable can cause undesired optical attenuation. Bending strain can also risk damaging optical fibers, such as furcated legs, exposed from the end portion of the fiber optic cable near the interconnection point.

To prevent or reduce bending strain on a fiber optic cable, strain relief devices may be employed at suitable locations. A strain relief device may be attached or assembled on portions of a fiber optic cable and configured to be secured to fiber optic equipment, such as a cabinet or equipment rack as examples. The strain relief device may be configured to be secured to a mounting device, wherein the mounting device is secured to fiber optic equipment to secure the strain relief device and in turn the fiber optic cable. Securing a portion of a fiber optic cable can reduce or prevent bending strain from being propagated along the fiber optic cable and/or to the connection points.

SUMMARY OF THE DETAILED DESCRIPTION

Embodiments disclosed in the detailed description include fiber optic cable mounting adapters and related fiber optic cable assemblies and methods for attaching external mounting devices to the fiber optic cable. The fiber optic mounting adapters can be configured to be secured to a portion of a fiber optic cable. The fiber optic mounting adapters can also be configured to be secured to external mounting devices compatible to be secured to fiber optic equipment, to secure the fiber optic mounting adapter, and in turn the fiber optic cable, to the fiber optic equipment. Securing a portion of a fiber optic cable can reduce or prevent bending strain from being propagated along the fiber optic cable. Undesired bending strain of a fiber optic cable can cause undesired optical attenuation. Bending strain can also risk damaging optical fibers, such as furcated legs, exposed from the end portion of the fiber optic cable. Multiple fiber optic mounting adapters can be secured to multiple portions of a fiber optic cable to secure the fiber optic cable in multiple locations to the fiber optic equipment.

In one embodiment, a fiber optic cable mounting adapter is disclosed. The fiber optic cable mounting adapter includes a mounting body and a slot, as well as first and second extension members. The mounting body may include a first end, a second end opposite the first end, and a cable mounting surface may be disposed longitudinally between the first end and second end. The slot may be disposed longitudinally in the mounting body and adjacent to the cable mounting surface. The slot may be configured to communicate with an external mounting structure. The first extension member may extend from the first end of the mounting body and may include a first extension member cable mounting surface. Also, the second extension member may extend from the second end of the mounting body and may include a second extension member cable mounting surface. In this manner, as a non-limiting example, the fiber optic cable mounting adapter includes the benefit of a secured connection between the mounting body and the external mounting structure through the use of a slot, which may not require additional components such as screws to secure.

In another embodiment, another fiber optic cable mounting adapter is disclosed. This fiber optic cable mounting adapter includes a mounting body. The mounting body has a minimum width and may comprise a first end, a second end opposite the first end, a cable mounting surface may be disposed longitudinally between the first end and the second end, and one or more fastener interfaces may be configured to communicate with an external mounting structure. The fiber optic cable mounting adapter also includes a first extension member having a first maximum width. The first extension member extends from the first end of the mounting body and has a first extension cable mounting surface. The fiber optic cable mounting adapter also includes a second extension member having a second maximum width. The second extension member extends from the second end of the mounting body and has a second extension cable mounting surface. The first and second extension cable mounting surfaces are each configured to receive one or more fasteners to secure the fiber optic cable mounting adapter to a fiber optic cable. In this embodiment, the first maximum width of the first extension member and second maximum width of the second extension member each may be less than a minimum width of the mounting body. In this manner, as a non-limiting example, the fiber optic cable mounting adapter includes a mounting body with a larger contact area available to interface with the fiber optic cable for securing the mounting body to the fiber optic cable. Narrower first and second extension members can be provided to securely interface the mounting body with the fiber optic cable with less weight and/or girth to the fiber optic cable.

In another embodiment, a fiber optic cable assembly is disclosed. The fiber optic cable assembly may include a fiber optic cable, a mounting adapter, and one or more first and second extension member fasteners to secure the mounting adapter to the fiber optic cable. The mounting adapter may include a mounting body as well as first and second extension members. The mounting body may include a first end, a second end opposite the first end, a cable mounting surface disposed longitudinally between the first end and the second end, and one or more fastener interfaces configured to receive an external mounting structure. The first and second extension members may extend from the first end and second end of the mounting body respectively, and may have first and second extension member cable mounting surfaces respectively. In this manner, as a non-limiting example, the mounting adapter may be securely orientated relative to the longitudinal axis of the fiber optic cable, because the mounting adapter may be disposed between the first and second extension member fasteners.

In another embodiment, a method for assembling a fiber optic cable assembly is disclosed. The method may include placing a cable mounting surface of a mounting adapter, a first extension member cable mounting surface, and a second extension member cable mounting surface in abutment with a fiber optic cable as to align the mounting adapter with a longitudinal axis of the fiber optic cable. The method may also include securing first and second extension members of the mounting adapter to the fiber optic cable with one or more first and second extension member fasteners respectively. The method may then include securing a mounting body of the mounting adapter to an external mounting structure using one or more fastener interfaces of the mounting adapter. In this manner, as a non-limiting example, the fiber optic cable may be attached to the external mounting structure quickly and with minimal operator skill required.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 3C depicts a side view of the fiber optic cable mounting adapter of FIG. 3A;

FIG. 3D depicts a bottom view of the fiber optic cable mounting adapter of FIG. 3A;

FIG. 3E depicts a cutaway cross-section view of the fiber optic cable mounting adapter of FIG. 3A;

FIG. 5A depicts a top view of another exemplary transition member of a fiber optic cable mounting adapter that includes a varied width and a curved width taper portion;

FIG. 5B depicts a top view of another exemplary transition member of a fiber optic cable mounting adapter that includes a varied width and a straight width taper portion;

FIG. 5C depicts a side view of another exemplary transition member of a fiber optic cable mounting adapter that includes a varied height and a curved height taper portion;

FIG. 5D depicts a side view of another exemplary transition member of a fiber optic cable mounting adapter that includes a varied height and a straight height taper portion;

FIG. 7 depicts a perspective view of a schematic diagram of another exemplary fiber optic cable mounting adapter including protrusions disposed on ends of the first and second extension members;

FIG. 9A depicts a side view of another exemplary fiber optic cable mounting adapter that includes a mounting body having a cable mounting surface having a V-groove shaped surface disposed therein;

FIG. 9B depicts a bottom view of the fiber optic cable mounting adapter of FIG. 9A;

FIG. 9C depicts a cutaway view of the fiber optic cable mounting adapter of FIG. 9A;

FIG. 10A depicts a side view of another exemplary fiber optic cable mounting adapter that includes a mounting body having a cable mounting surface having a concave rounded groove-shaped surface disposed therein;

FIG. 10B depicts a bottom view of the fiber optic cable mounting adapter of FIG. 10A;

FIG. 10C depicts a cutaway view of the fiber optic cable mounting adapter of FIG. 10A;

FIG. 11A depicts a side view of another exemplary fiber optic cable mounting adapter that includes a mounting body having a cable mounting surface having a flat-shaped surface disposed therein;

FIG. 11B depicts a bottom view of the fiber optic cable mounting adapter of FIG. 11A;

FIG. 11C depicts a cutaway view of the fiber optic cable mounting adapter of FIG. 11A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include fiber optic cable mounting adapters and related fiber optic cable assemblies and methods for attaching external mounting devices to the fiber optic cable. The fiber optic mounting adapters can configured to be secured to a portion of a fiber optic cable. The fiber optic mounting adapters can also be configured to be secured to external mounting devices compatible to be secured to fiber optic equipment, to secure the fiber optic mounting adapter, and in turn the fiber optic cable, to the fiber optic equipment. Securing a portion of a fiber optic cable can reduce or prevent bending strain from being propagated along the fiber optic cable. Undesired bending strain of a fiber optic cable can cause undesired optical attenuation. Bending strain can also risk damaging optical fibers, such as furcated legs, exposed from the end portion of the fiber optic cable. Multiple fiber optic mounting adapters can be secured to multiple portions of a fiber optic cable to secure the fiber optic cable in multiple locations to fiber optic equipment.

Figure 1A:
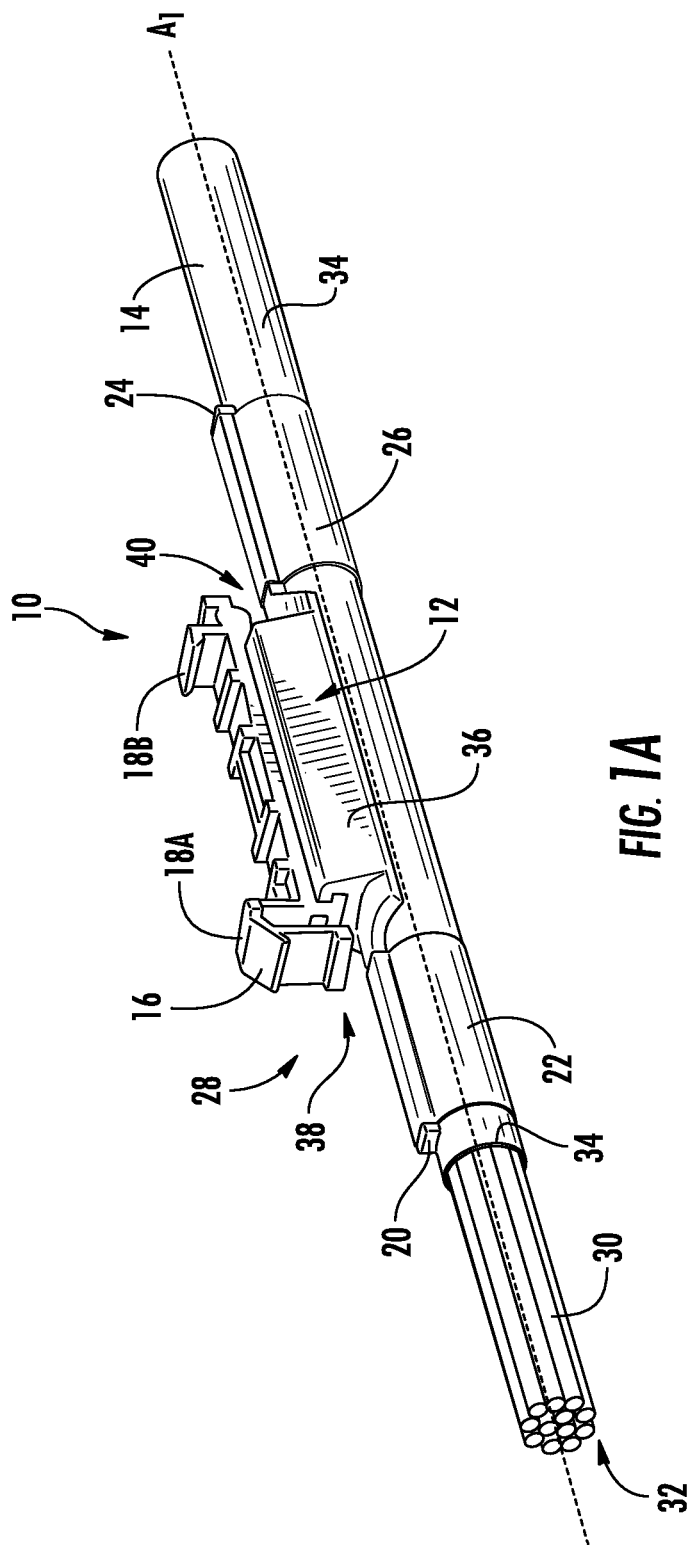
FIG. 1A is a perspective view of a schematic diagram of an exemplary fiber optic cable assembly including a fiber optic cable mounting adapter having first and second extension members extending from a mounting body, the first and second extension members secured to a fiber optic cable to secure the mounting body to the fiber optic cable.
Figure 1B:
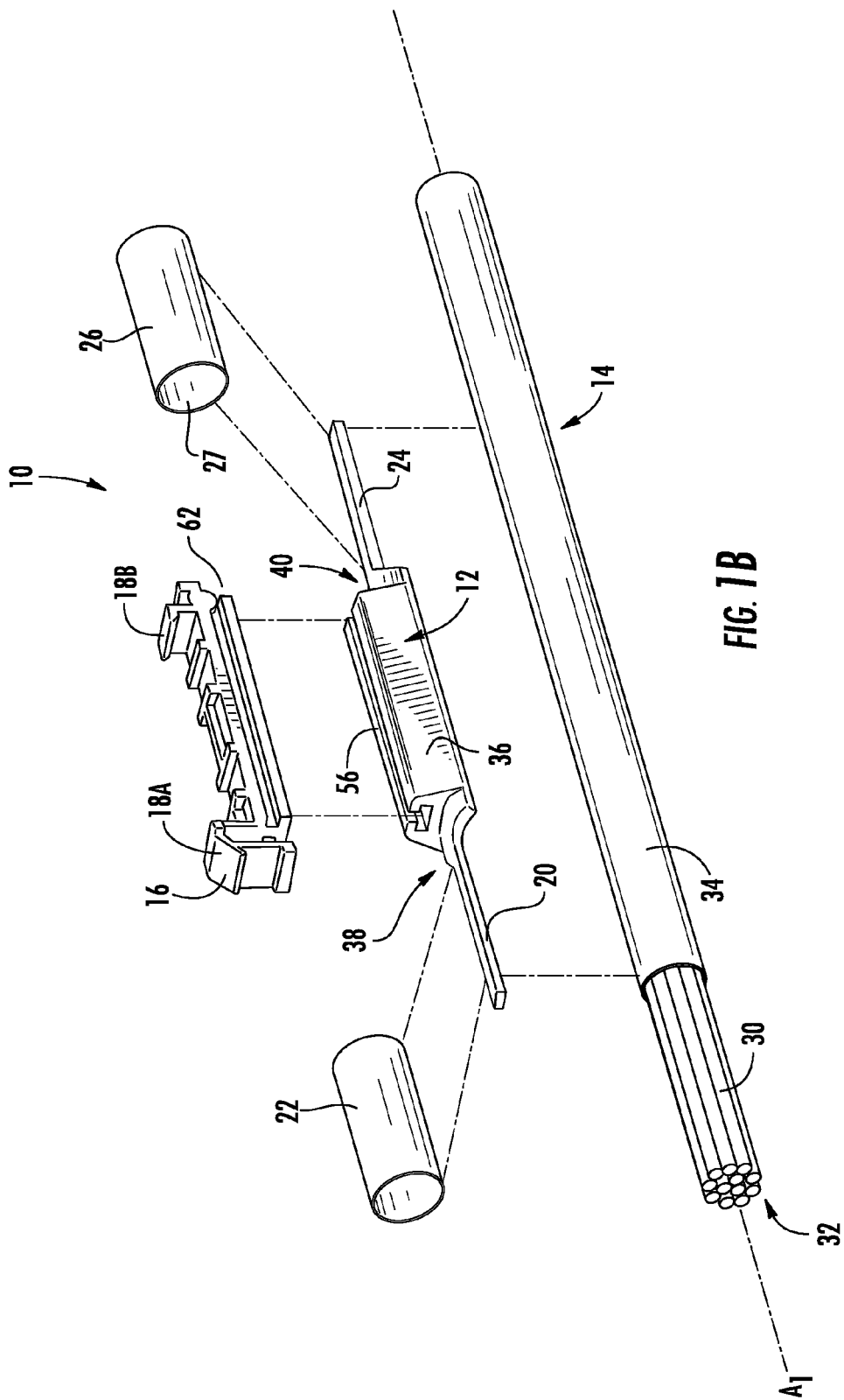
FIG. 1B is an exploded view of the fiber optic cable assembly of FIG. 1A.

In this regard, FIG. 1A illustrates a schematic diagram of an exemplary fiber optic cable mounting assembly 10. FIG. 1B depicts an exploded view of the fiber optic cable mounting assembly of FIG. 1A. With reference to FIGS. 1A and 1B, the fiber optic cable mounting assembly 10 in this embodiment includes a fiber optic cable mounting adapter 12 (hereafter referred to "mounting adapter 12") mounted to a fiber optic cable 14. The fiber optic cable 14 may be utilized as a distribution cable, drop cable, or other type of cable. As will be discussed below in more detail, the mounting adapter 12 is also configured to be secured to or receive an external mounting structure, such as external mounting structure 16 in FIG. 1A, that can be secured to fiber optic equipment, such as an equipment rack, chassis, or other mounting structure. In this manner, because the external mounting structure 16 is also secured to the mounting adapter 12, securing the external mounting structure 16 to fiber optic equipment also secures the fiber optic cable 14. For example, protrusions 18A, 18B disposed in the external mounting structure 16 may be configured to be received within openings in fiber optic equipment in a compatible arrangement with the protrusions 18A, 18B to secure the external mounting structure 16 to the fiber optic equipment. Securing the fiber optic cable 14 to fiber optic equipment in this manner can provide strain relief to the fiber optic cable 14. Providing strain relief to the fiber optic cable 14 may prevent or reduce undesired optical attenuation caused by bending of optical fibers 32 in the fiber optic cable 14. Providing strain relief to the fiber optic cable 14 may also prevent or reduce the possibility of damaging optical fibers in the fiber optic cable 14.

The external mounting structure 16 may be hardware equipment such as a cabinet, rack enclosure, or an intermediate accessory that attaches to the hardware equipment to secure the fiber optic cable 14 to the equipment and/or to provide strain relief. The recently mentioned external mounting structure 16 may be made of a strong flexible material or a rigid material, for example, plastic, aluminum, or steel as non-limiting examples.

The fiber optic cable mounting adapter 12 can be provided in a fiber optic cable assembly. In this regard, a cabling assembly will be discussed. As shown in an exemplary embodiment depicted in FIGS. 1A-1B, the first extension member 20 is secured to the fiber optic cable 14 with the first extension member fastener 22, and the second extension member 34 is secured to the fiber optic cable 14 with the second extension member fastener 26. One or more first and second extension member fasteners 22, 26 may be used in this embodiment. More specifically in FIG. 1A, the at least one of the one or more first extension member fasteners 22 encircles both the fiber optic cable 14 and the first extension member 20, and at least one of the one or more second extension member fasteners 26 encircles both the fiber optic cable 14 and the second extension member 24.

In another embodiment, glue 27 may be disposed between at least one of the first extension member fasteners 22 and first extension member 20 and/or between at least one of the second extension member fasteners 26 and the second extension member 24. As an example, FIG. 1B depicts glue 27 within the second extension member fastener 26. The glue 27 may be, for example, an epoxy-based substance, an adhesive, or a cohesive.

The mounting adapter 12 may be secured to any desired portion of the fiber optic cable 14. In the example of FIGS. 1A and 1B, the mounting adapter 12 is secured to an end portion 28 of the fiber optic cable 14. In this embodiment, the fiber optic cable 14 defines a longitudinal direction $A_l$ and includes a plurality of optical fiber sub-units 30 each containing one or more optical fibers 32 disposed longitudinally within a cable jacket 34 of the fiber optic cable 14. The optical fiber sub-units 30 may expose from the cable jacket 34 to establish connections between the optical fibers 32 disposed therein and fiber optic equipment. The optic fibers 32 may or may not be buffered. The ends of the optical fibers 32 may be "connectorized" with fiber optic connectors (examples: FC, LC, ST, MTP, etc.).

With continuing reference to FIGS. 1A and 1B, the mounting adapter 12 in this embodiment is configured to be conveniently secured to the fiber optic cable 14. As will be discussed in more detail below, the mounting adapter 12 is configured to be secured to various outer diameters of fiber optic cable 14 as opposed to only be configured to be compatible with one type or narrow range of outer diameters of fiber optic cable 14 for increased flexibility. This may also be advantageous over furcation plugs which are typically custom designed for the particular outer diameter of a fiber optic cable 14. In this regard as illustrated in FIG. 1B, to easily and conveniently be able to secure the mounting adapter 12 to the fiber optic cable 14, the mounting adapter 12 is comprised of three main components. A mounting body 36 is provided that is configured to receive the external mounting structure 16. A first extension member 20 and a second extension member 24 are disposed on and extend from a first end 38 and second end 40 of the mounting body 36, respectively. The first extension member 20 and second extension member 24 are configured to receive first and second extension member fasteners 22, 26, respectively, to secure the first extension member 20 and second extension member 24 to the fiber optic cable 14. By securing the first extension member 20 and second extension member 24 to the fiber optic cable 14, the mounting body 36 is secured to the fiber optic cable 14.

As one non-limiting example, the first and second extension member fasteners 22, 26, respectively may be heat shrink tubing that can be disposed around a portion of the fiber optic cable 14 disposed adjacent to the first and second extension members 20, 24, respectively, and heat shrunk to secure the first and second extension members 20, 24 to the cable jacket 34. Other types of first and second extension member fasteners 22, 26 may be employed. Examples of other types of first and second extension member fasteners 22, 26 are discussed in more detail below.

Figure 2:
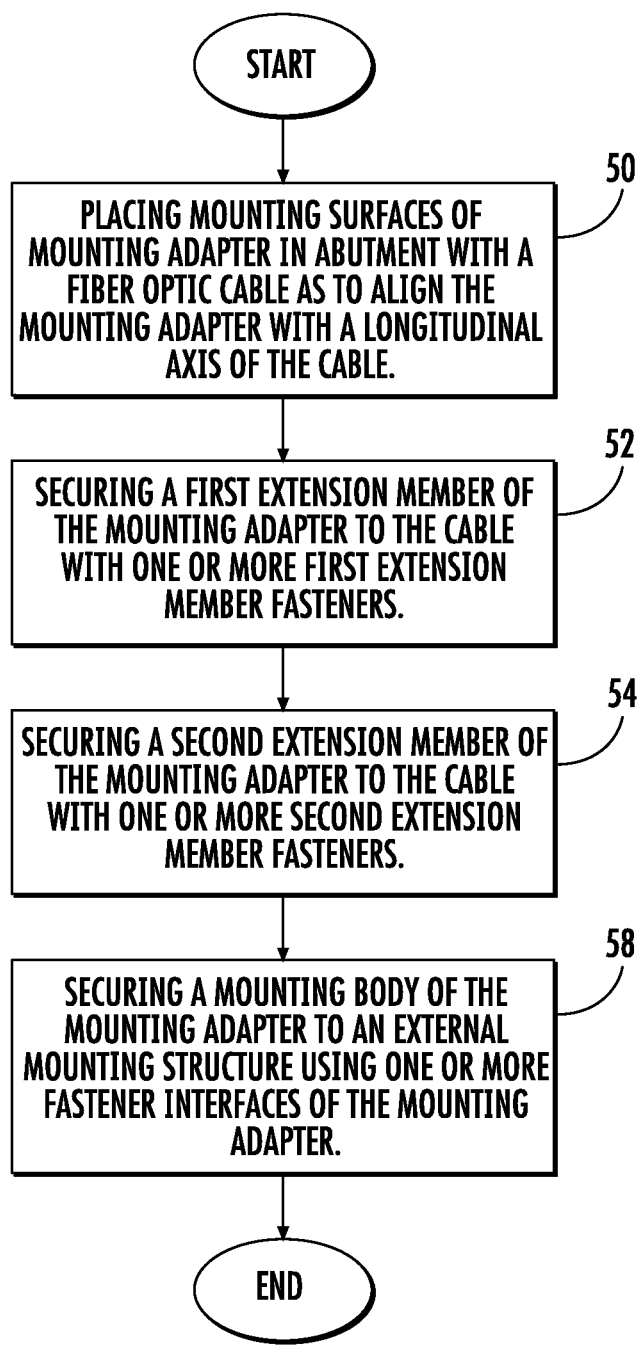
FIG. 2 illustrates an exemplary process for attaching a fiber optic cable mounting adapter to a fiber optic cable, and an external mounting structure to the fiber optic cable mounting adapter.

Next, a method is disclosed for attaching the fiber optic cable mounting adapter 12 to the fiber optic cable 14 and the external mounting structure 16. The process may first include placing the cable mounting surface 42 of a mounting adapter 12, a first extension member cable mounting surface 46, and a second extension member cable mounting surface 48 in abutment with a fiber optic cable 14 as to align the mounting adapter 12 with a longitudinal axis $A_1$ of the fiber optic cable 14 (block 50 in FIG. 2). Next, a first extension member 20 of the mounting adapter 12 may be secured to the fiber optic cable 14 with one or more first extension member fasteners 22 (block 52 in FIG. 2). In the next step, a second extension member 24 of the mounting adapter 12 may be secured to the fiber optic cable 14 with one or more second extension member fasteners 26 (block 54 in FIG. 2). Lastly, a mounting body 36 of the mounting adapter 12 may be secured to an external mounting structure 16 using one or more fastener interfaces 56 of the mounting adapter 12 (block 58 in FIG. 2).

FIGS. 3A-3G, illustrate various views of the exemplary mounting adapter 12(1) that is similar to the mounting adapter 12 of FIGS. 1A and 1B. In this embodiment of the mounting adapter 12(1), the first and second extension members 20, 24 are attached or integrated with the mounting body 36 without providing an intermediate transition member as will be discussed in more detail below. Common components between the mounting adapter 12(1) in FIGS. 3A-3G and the mounting adapter 12 in FIGS. 1A and 1B are shown with common element numbers. As discussed above and illustrated in FIGS. 3A-3C, the mounting adapter 12(1) comprises the mounting body 36, a first extension member 20, and a second extension member 24. The mounting body 36 may be made of a strong flexible or rigid structure, for example, hard plastic, aluminum, or steel, as non-limiting examples. The flexibility or lack thereof of the mounting body 36 will affect the amount of strain relief provided by the mounting adapter 12(1). The greater the flexibility, the less strain relief provided by the mounting adapter 12(1). However, providing flexibility in the mounting body 36 may also provide greater avoidance of sharp bending of the fiber optic cable 14 at the first and second ends 38, 40 of the mounting body 36. Similarly, the first and second extension members 20, 24 may be made of a strong flexible or rigid structure, for example, hard plastic, aluminum, or steel, as non-limiting examples. The first and second extension members 20, 24 may be made of the same material as the mounting body 36. Again the greater the flexibility of the first and second extension members 20, 24, the less strain relief provided, but the greater avoidance of sharp bending of the fiber optic cable 14 adjacent to the first and second extension members 20, 24.

In continuation of the previous discussion, but in a greater level of detail regarding the individual components, the mounting body 36 may include the first end 38 and the second end 40. The first end 38 may be opposite the second end 40. A cable mounting surface 42 shown in FIG. 3D and disposed longitudinally between the first end 38 and second end 40 may be included as part of the mounting body 36. The cable mounting surface 42 may be a main contact surface between the fiber optic cable 14 and the mounting body 36. The cable mounting surface 42 may be used to support the fiber optic cable 14 in combination with the first and second extension members 20, 24. The mounting body 36 may also include one or more fastener interfaces 56 configured to communicate with an external mounting structure 16. The purpose of the fastener interfaces 56 may be to provide surfaces upon the mounting body 36 for attachment to the external mounting structure 16.

The first extension member 20 may extend from the first end 38 of the mounting body 36 and may include a first extension cable mounting surface 46. Likewise, the second extension member 24 may extend from the second end 40 of the mounting body 36 and may include a second extension cable mounting surface 48. The first and the second extension cable mounting surfaces 46, 48 contact the fiber optic cable 14 to provide support and thereby relieve strain from the fiber optic cable 14. In this embodiment, both the first extension member 20 and the second extension member 24 have a first maximum width $W_1$ and a second maximum width $W_2$ respectively as illustrated in FIG. 3D. Both $W_1$ and $W_2$ may each be less than the minimum width $W_0$ of the mounting body 36. One advantage of having this relationship between widths $W_0$, $W_1$, and $W_2$ may be to provide for the first and second extension members 20, 24 to establish a more secure attachment to the fiber optic cable 14 than possible if the first and second extension members 20, 24 were wider and thus were more difficult to attach to a broad range of outer diameters of the fiber optic cable 14.

In another embodiment, at least one of the first maximum width $W_1$ of the first extension member 20 and the second maximum width $W_2$ of the second extension member 24 may be less than eighty percent (80%) of the minimum width $W_0$ of the mounting body 36. This may enable the first or second extension members 20, 24 to more easily attach to the fiber optic cable 14 because different fasteners (discussed later) may travel a shorter distance around these elements. In other embodiments, the first maximum width $W_1$ and the second maximum width $W_2$ of the first and second extension members 20, 24 may not be equal.

In yet another embodiment, with continuing reference to FIGS. 1A and 1B, the mounting body 36 may include one or more fastener interfaces 56 to attach the fiber optic cable mounting adapter 12 to the external mounting structure 16. The one or more fastener interfaces 56 may comprise a slot 60 disposed longitudinally in the mounting body 36 adjacent to the cable mounting surface 42 and configured to receive the external mounting structure 16. Providing the slot 60 as the fastener interface 56 in the fiber optic cable mounting adapter 12 may create a stable connector for attachment and securing of the external mounting structure 16 due to its longitudinal orientation. For example, the slot 60, when used in combination with a male T-slot member 62 (FIG. 1B), may form a stable connection that resists twisting movement of the mounting adapter 12 with respect to the external mounting structure 16.

Figure 3A:
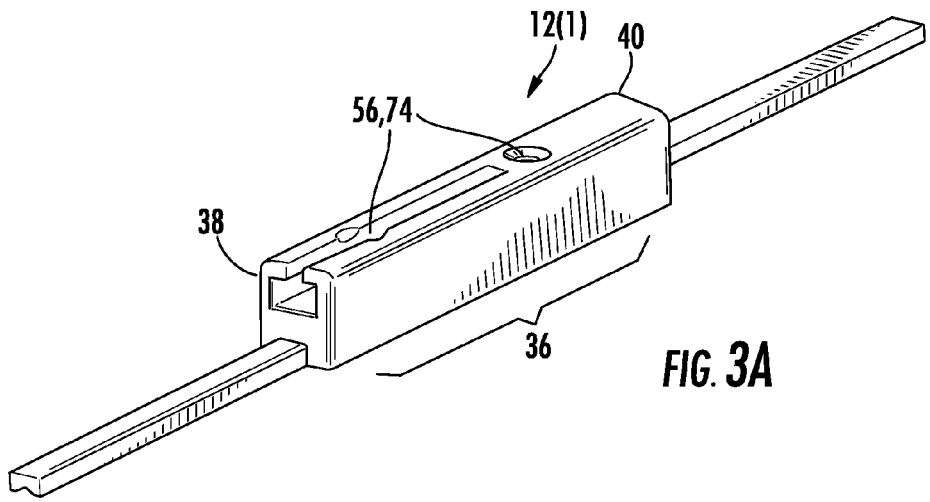
FIG. 3A is a perspective view of the fiber optic cable mounting adapter of FIG. 1A, including one or more fastener interfaces.
Figure 3B:
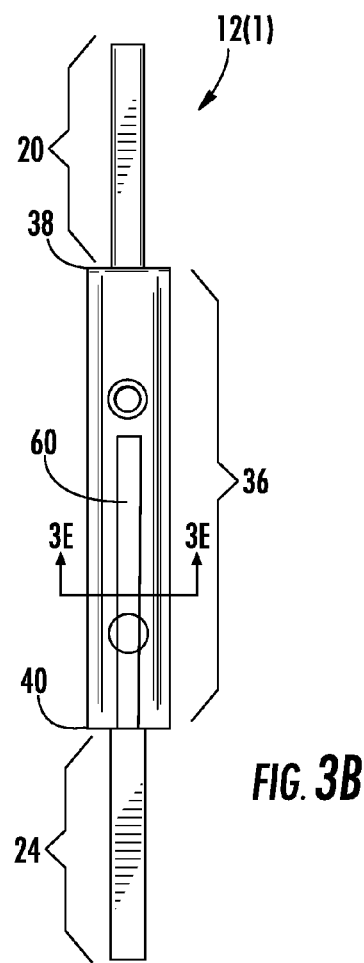
FIG. 3B depicts a top view of the fiber optic cable mounting adapter of FIG. 3A.
Figure 3F:
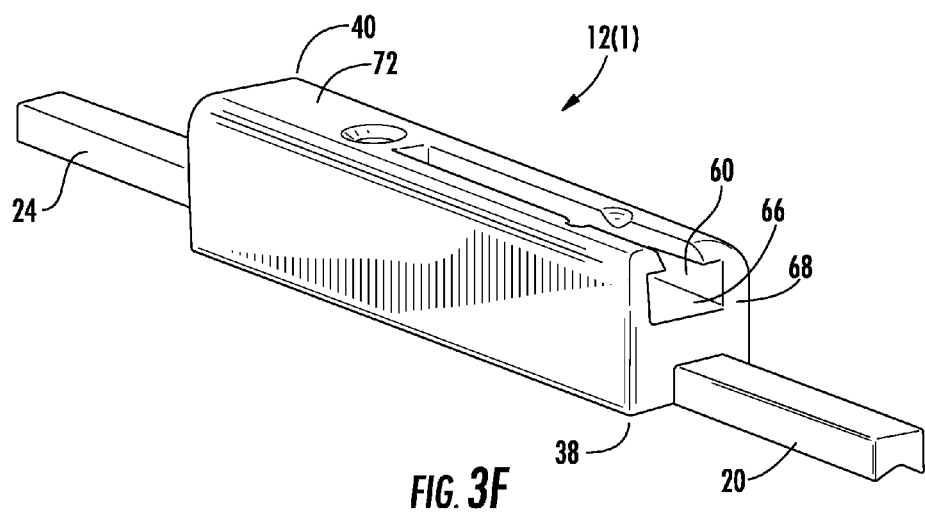
FIG. 3F depicts a close-up perspective schematic diagram of the fiber optic cable mounting adapter of FIG. 3A showing the detail of a slot.
Figure 3G:
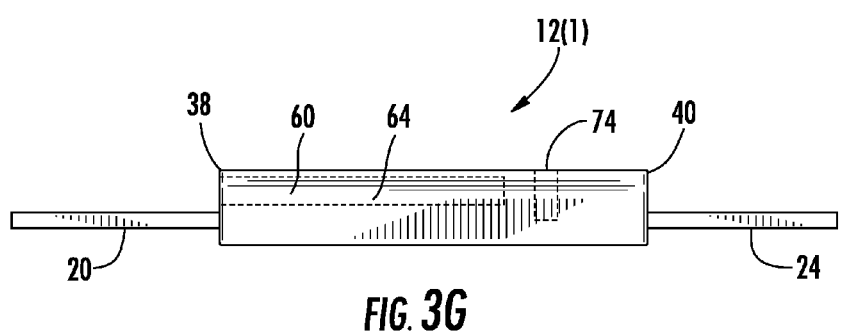
FIG. 3G depicts a side view of the fiber optic cable mounting adapter of FIG. 3F.

As depicted in FIGS. 3F-3G, the slot 60 may comprise an internal cavity 64 between the first end 38 and the second end 40 of the mounting body 36. The slot 60 may further comprise a slot orifice 66 in communication with the internal cavity 64 at an end surface 68 at the first end 38 of the mounting body 36. The end surface 68 may face the first extension member 20 and may also be included as part of the first transition member 70, which will be discussed below in reference to FIG. 4. The slot orifice 66 may also extend into a top surface 72 of the mounting body 36 opposite the cable mounting surface 42. The slot orifice 66 may enable the male T-slot member 62 to enter the internal cavity 64 of the mounting body 36 to form an attachment and to depart the internal cavity 64 when the attachment between the external mounting structure 16 and the mounting adapter 12 is no longer required.

As depicted in FIG. 3E, the slot 60 may be T-shaped and may also be in a geometric plane $P_1$ adjacent to the cable mounting surface 42. Other shaped slots 60 may also be used, for example a star-shaped slot or polygonal-shaped slot, or partially curved slot as non-limiting examples. The T-shaped slot 60 may be employed to provide effective resistance to twisting. The T-shaped slot 60 may also form a tight attachment of the external mounting structure 16 to the mounting body 36 and is relatively inexpensive to manufacture. Further, as shown in FIG. 3A, the one or more fastener interfaces 56 may additionally comprise one or more fastener orifices 74 configured to communicate with, for example, one or more fastener devices (not shown), such as screws or bolts to further secure. Other embodiments of the one or more fastener interfaces 56 may include, for example, combinations of the one or more slots 60 and the one or more fastener orifices 74. Further, the term fastener interfaces 56 as used in this disclosure may be interpreted broadly to be any one or more objects, devices or surfaces to secure the mounting body 36 to the external mounting structure 16.

Figure 4:
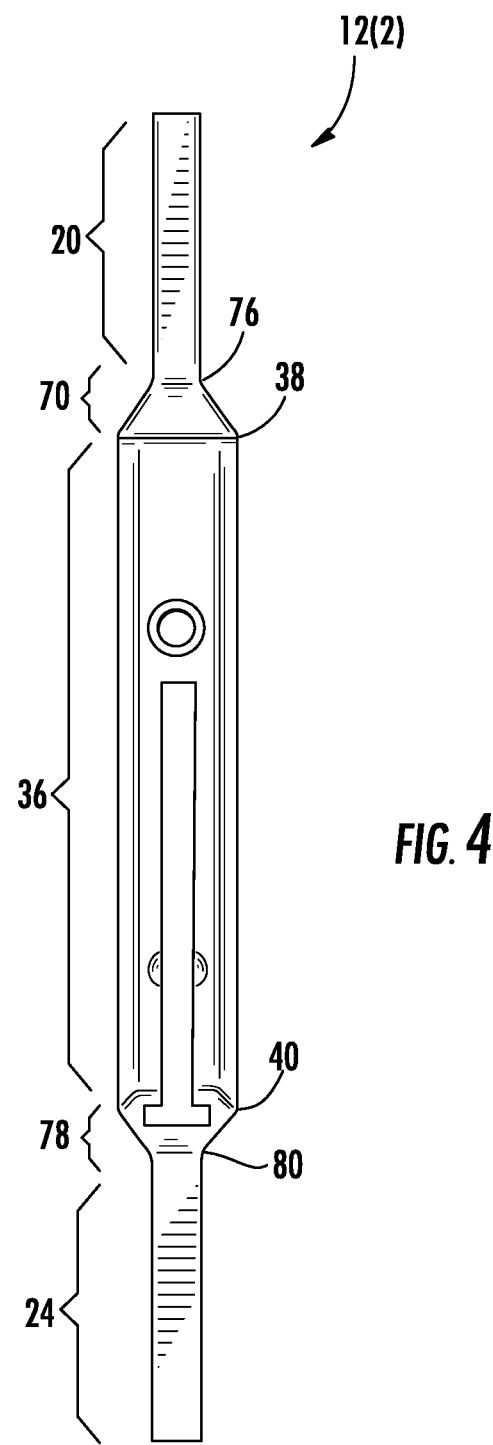
FIG. 4 depicts a top view of the fiber optic cable mounting adapter of FIG. 3A depicting exemplary first and second transition members disposed between the mounting body and the first and second extension members.

FIG. 4 illustrates a top view of the exemplary mounting adapter 12(2) that is similar to the mounting adapter 12 of FIGS. 1A and 1B. In this embodiment of the mounting adapter 12(2), the first and second extension members 20, 24 are attached or integrated with the mounting body 36 with first and second transition members 70, 78 as will be discussed in more detail below. Common components between the mounting adapter 12(2) in FIG. 4 and the mounting adapter 12 in FIGS. 1A and 1B are shown with common element numbers. As depicted in FIG. 4, another exemplary fiber optic cable mounting adapter 12(2) is provided. Common components between the mounting adapter 12(2) in FIG. 4 and the mounting adapter 12 in FIGS. 1A and 1B are shown with common element numbers. In this embodiment, the mounting adapter 12(2) may optionally further comprise a first transition member 70 disposed between the first end 38 of the mounting body 36 and a proximal end 76 of the first extension member 20. In addition, it may also optionally comprise a second transition member 78 disposed between the second end 40 of the mounting body 36 and a proximal end 80 of the second extension member 24. For example, the first and second transition members 70, 78 may allow a wider mounting body 36 to be attached to narrower first and second extension members 20, 24 without damage due to cracking caused by cycle fatigue. More specifically, after the fiber optic cable mounting adapter 12(2) is installed, cyclical stresses may be experienced over time by the cable mounting adapter 12(2), the fiber optic cable 14, or the external mounting structure 16. Different embodiments of the first and second transition members 70, 78 may reduce failures of the fiber optic cable mounting adapter 12(2) due to cyclical stress cracking between the mounting body 36 and the first and second extension members 20, 24 respectively.

Variations of the first and second transition members 70, 78 are also possible. For example, in one embodiment depicted in FIG. 5A, the width of the first transition member 70 can vary between the first end 38 of the mounting body 36 and the proximal end 76 of the first extension member 20 as illustrated by the first transition member 70 widths $W_3$ and $W_4$. The varying width both enables the larger mounting body 36 to be attached to smaller first and second extension members 20, 24 and also reduces the chance of failure due to cyclical stress cracking. Similarly, the width may also vary (not shown) for the second transition member 78. Further, embodiments of the first and second transition members 70, 78 may include one or more various tapered portions to vary width or height because cyclical stress cracking also may occur along the height of the mounting body 36.

FIGS. 5A-5B, illustrate top views of a curved width tapered portion and a straight width tapered portion of the exemplary mounting adapters 12(3) and 12(4) respectively that are similar to the mounting adapter 12 of FIGS. 1A and 1B. In addition, FIGS. 5C-5D, illustrate side views of a curved height tapered portion and a straight height tapered portion of the exemplary mounting adapters 12(5) and 12(6) respectively that are similar to the mounting adapter 12 of FIGS. 1A and 1B. In these embodiments of the mounting adapters 12(3) to 12(6), the first and second extension members 20, 24 are attached or integrated with the mounting body 36 utilizing an intermediate transition member having various tapered portions. Common components between the mounting adapters 12(1) to 12(6) in FIGS. 5A-5D and the mounting adapter 12 in FIGS. 1A and 1B are shown with common element numbers. In this regard, FIG. 5A illustrates an embodiment of a curved width tapered portion 82 of the mounting adapter 12(3). FIG. 5B depicts an embodiment of a straight width tapered portion 84 of the mounting adapter 12(4) because straight tapered portions may have lower manufacturing cost. FIGS. 5C and 5D depict a curved height tapered portion 86 of the mounting adapter 12(5) and a straight height tapered portion 88 of the mounting adapter 12(6) for either a first or second transition member 70, 78 utilizing the terms $H_1$ and $H_2$ to designate height measurements. The tapered portions may be used to minimize cyclical stress cracking, as previously discussed. The taper may be straight or curved in either the width and/or height of the first or second transition members 70, 78. This allows a taller mounting body 36 than the first and second extension members 20, 24. Thereby more material volume may be available to support the stronger fastener interfaces 56 of the mounting body 36, for example, a slot 60.

Figures 6A, 6B:
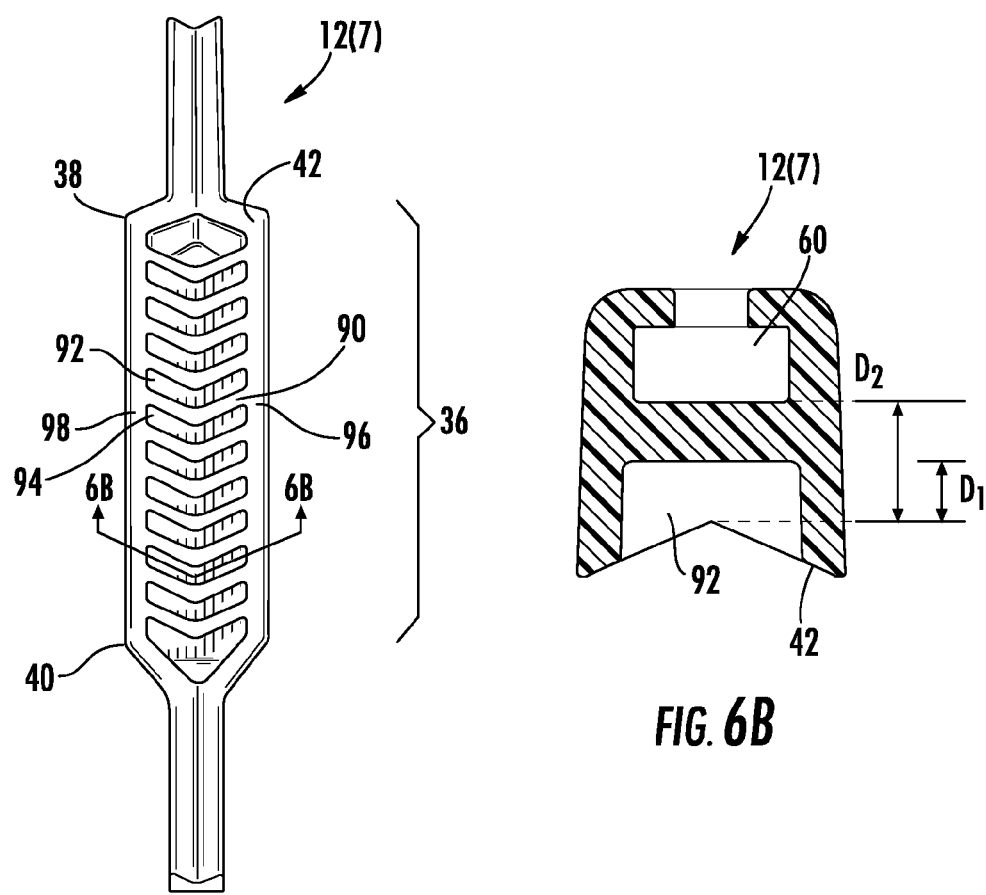
FIG. 6A depicts a bottom view of a fiber optic cable mounting adapter of FIGS. 1A and 1B, wherein the cable mounting surface of the mounting body includes a plurality of flexure members and adjacent cavities.
FIG. 6B depicts a cutaway view of the fiber optic cable mounting adapter of FIG. 6A showing depth distance of the adjacent cavity and breakthrough distance.

FIGS. 6A and 6B, illustrate a bottom and cutaway views, respectively, of the exemplary mounting adapter 12(7) that is similar to the mounting adapter 12 of FIGS. 1A and 1B. In this embodiment of the mounting adapter 12(7), flexure members 90 are provided as will be discussed in more detail below. Common components between the mounting adapter 12(7) in FIGS. 6A and 6B and the mounting adapter 12 in FIGS. 1A and 1B are shown with common element numbers. In this embodiment of mounting adapter 12(7) as shown in FIG. 6A, the fiber optic cable mounting adapter 12(7) may also comprise at least one flexure member 90 disposed in the cable mounting surface 42 of the mounting body 36. The at least one flexure member 90 may be disposed between the first end 38 and the second end 40 of the mounting body 36. The flexure member 90 may provide stiffness to the mounting adapter 12(7) through voids of material (first and second adjacent cavities 92, 94) between the flexure members 90 in the mounting body 36. Each flexure member 90 may be connected to a first longitudinal surface 96 and a second longitudinal surface 98 of the mounting body 36. The first and second longitudinal surfaces 96, 98 may be opposite to each other and each are adjacent to the cable mounting surface 42. The flexure member 90 may be separated by first and second adjacent cavities 92, 94 disposed within the cable mounting surface 42 of the mounting body 36. The first and second adjacent cavities 92, 94 may or may not breakthrough to the opposite side of the mounting body 36, but may extend at least one-quarter of the distance required from the cable mounting surface 42 to breakthrough to the opposite side of the mounting body 36. The adjacent cavities 92, 94 in combination with the at least one flexure member 90 may reduce the weight of the mounting adapter 12(7). FIG. 6B depicts the first adjacent cavity 92 measured from the cable mounting surface 42 to a depth measured as distance $D_1$ that is less than the distance $D_2$ needed to breakthrough to the opposite side of the cable mounting surface 42. The depth of the first or second adjacent cavities 92, 94 may be different. The at least one flexure members 90 may have different cross sections at the cable mounting surface 42 to meet the flexibility requirements of the mounting adapter 12(7). For example, a chevron-shaped cross-section 90A of mounting adapter 12(10) may be used as in FIG. 9B, a curved cross section 80B of mounting adapter 12(11) in FIG. 10B, or a straight cross section 80C of mounting adapter 12(12) as shown in FIG. 11B. For example, the chevron-shaped cross-section 90A may be a V-shape of various angles. Alternatively, the fiber optic cable mounting adapter 12(1) may be solid without the adjacent cavities 92, 94 as shown earlier in FIG. 3D, to minimize flexibility of the mounting body 36 and thereby offer maximum resistance to the bending of the fiber optic cable 14.

FIG. 7, illustrates a perspective view of the exemplary mounting adapter 12(8) that is similar to the mounting adapter 12 of FIGS. 1A and 1B. In this embodiment of the mounting adapter 12(8), the first and second extension members 20, 24 include a first and second protrusion 100, 102 respectively. Common components between the mounting adapter 12(8) in FIG. 7 and the mounting adapter 12 in FIGS. 1A and 1B are shown with common element numbers. In this embodiment of mounting adapter 12(8) shown in FIG. 7, the fiber optic mounting adapter 12(8) may optionally include one or more first protrusions 100 disposed on the first extension member 20 and one or more second protrusions 102 disposed on the second extension member 24. As discussed in more detail below, the first and second protrusions 100, 102 may prevent first and second extension member fasteners 22, 26 from slipping on the first and second extension members 20, 24. This slipping may occur as the mounting adapter 12(8) is subject to cyclic movement from the fiber optic cable 14. Slipping of the first and second extension member fasteners 22, 26 can cause the connection between the mounting adapter 12(8) and the fiber optic cable 14 to fail and disengage, causing damage to the fiber optic cable 14. In order to prevent or reduce slipping of the first and second extension member fasteners 22, 26 from the first and second extension members 20, 24, the first and second protrusions 100, 102 may be located on surfaces 104, 106 of the first and second extension members 20, 24 respectively that are opposite the first and second extension member cable mounting surfaces 46, 48. FIG. 7 further depicts one of the first protrusions 100 located at a distal end 108 of the first extension member 20 and one of the second protrusions 102 located at a distal end 110 of the second extension member 24.

Figure 8:
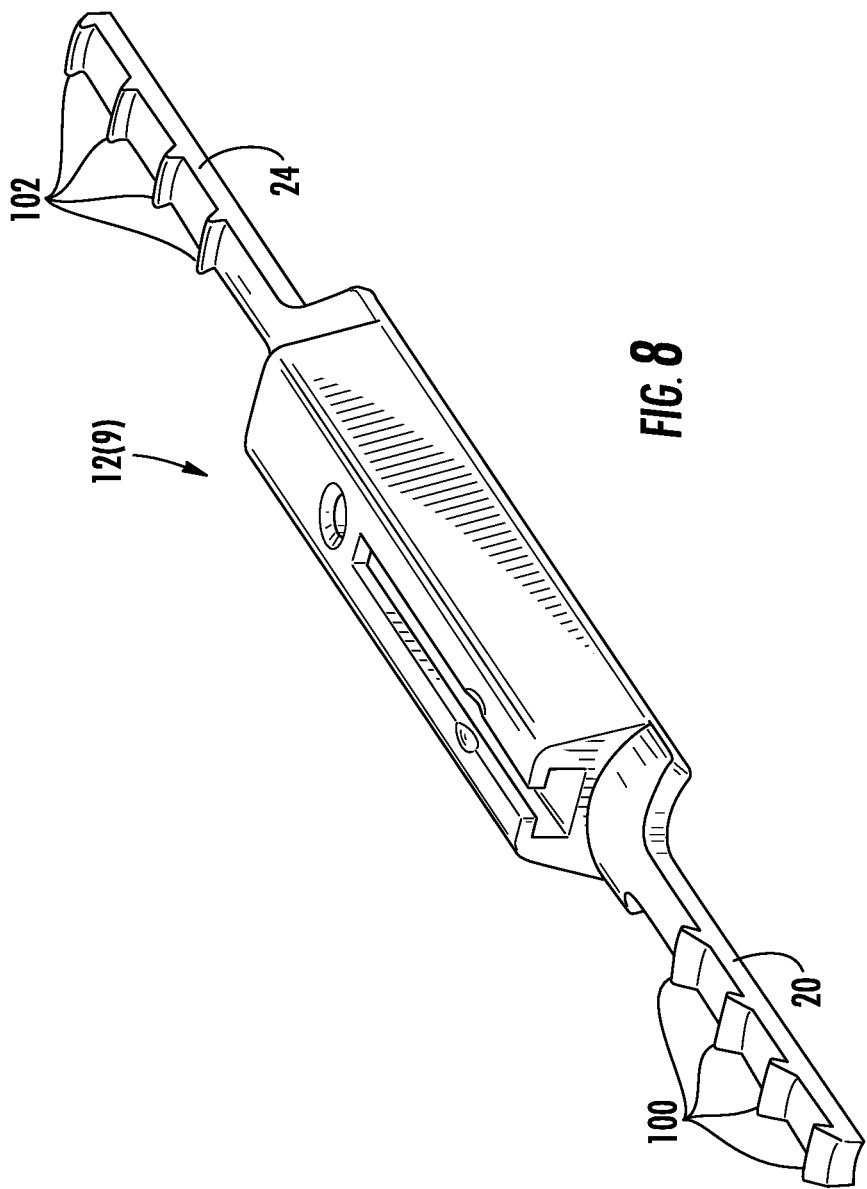
FIG. 8 depicts a perspective view of a schematic diagram of another exemplary fiber optic cable mounting adapter including a plurality of protrusions disposed in both the first and second extension members.

It may also be desired to provide multiple fasteners along the first and second extension members 20, 24. In this regard, FIG. 8 illustrates a perspective view of the exemplary mounting adapter 12(9) that is similar to the mounting adapter 12 of FIGS. 1A and 1B. In this embodiment of the mounting adapter 12(9), the first and second extension members 20, 24 include a plurality of both first and second protrusions 100, 102 respectively. Common components between the mounting adapter 12(9) in FIG. 8 and the mounting adapter 12 in FIGS. 1A and 1B are shown with common element numbers. The mounting adapter 12(9) includes one or more first protrusions 100 at multiple locations on the first extension member 20 and the one or more second protrusions 102 at multiple locations on the second extension member 24. Providing multiple first and second protrusions 100, 102 may prevent or reduce slipping of a plurality of first and second extension member fasteners 22, 26 from the first and second extension members 20, 24.

The first and second protrusions 100, 102 may also have variations. As depicted in the close-up drawing in FIG. 7, the first and second protrusions 100, 102 may comprise an orthogonal protrusion surface 112 which is orthogonal to the longitudinal direction ($A_1$) of the fiber optic cable mounting adapter 12(8). The first and second protrusions 100, 102 may also comprise an angled protrusion surface 114 adjacent to the orthogonal protrusion surface 112. The orthogonal protrusion surface 112 may face the mounting body 36, and the angled protrusion surface 114 may face away from the mounting body 36. Other embodiments of the first and second protrusions 100, 102 may have combinations of the orthogonal and angled protrusion surfaces 112, 114 which may be adjacent or opposite to each other. The first and second protrusions 100, 102 may optionally incorporate a rougher surface texture for more friction grip with the one or more first and second extension member fasteners 22, 26. The optional rougher surface texture may also prevent slipping and may be for example applied by machining the first and second protrusions 100, 102 with a relatively coarse abrasive. In addition, the different embodiments disclosed of the first and second protrusions 100, 102 may be used by those skilled in the art to optimize attachment to the fiber optic cable 14 using different embodiments of first and second protrusions 100, 102.

As discussed earlier and depicted in FIGS. 1A and 3D, the fiber optic cable mounting adapter 12 may contact the fiber optic cable 14 at the cable mounting surface 42, the first extension member cable mounting surface 46, and the second extension member cable mounting surface 48. The shapes of the cable mounting surfaces 42, 46, 48 may enable the mounting adapter 12 to increase the contact area abutting the fiber optic cable 14 to provide a more secure attachment for a wide range of fiber optic cable diameters. FIGS. 9A-9C, 10A-10C, and 11A-11C, illustrate side, bottom, and cutaway views of the exemplary mounting adapters 12(10), 12(11), and 12(12) that are similar to the mounting adapter 12 of FIGS. 1A and 1B. In these embodiments of the mounting adapters 12(10), 12(11), and 12(12), the cable mounting surface 42 is formed as a V-groove surface 116, concave rounded groove 122, and flat surface 124, respectively. Common components between the mounting adapters 12(10), 12(11), and 12(12) in FIGS. 9A-11C and the mounting adapter 12 in FIGS. 1A and 1B are shown with common element numbers.

In this regard, FIGS. 9A-9C depict the fiber optic cable mounting adapter 12(10) with the cable mounting surface 42 formed as a concave V-groove surface 116. The concave V-groove surface 116 in this embodiment comprises an apex 118 in the longitudinal direction ($A_1$) and two flat V-groove side surfaces 120. The concave V-groove surface 116 in this embodiment may also be formed on the first extension member cable mounting surface 46 and the second extension member cable mounting surface 48. At least one of these cable mounting surfaces 42, 46, 48 may comprise the concave V-groove surface 116. The V-groove surface 116 may allow centering the fiber optic cable 14 at the apex 118 and the two flat V-groove side surfaces 120 to accommodate a broad range of various outer diameters of the fiber optic cable 14. The concave V-groove surface 116 may also provide stability to the mounting adapter 12(10) disposed on the cable jacket 34. The concave V-groove surface 116 may be of a width that allows compatibility with different diameter sizes of fiber optic cables 14 to allow flexibility in utilizing the mounting adapter 12(10) with different fiber optic cable 14 sizes.

In an alternative embodiment of the mounting adapter 12(11) depicted in FIGS. 10A-10C, at least one of the cable mounting surfaces 42, 46, 48 may comprise a concave rounded groove 122. The advantage of the concave rounded groove 122 may be a close fit with a limited range of diameters of fiber optic cables 14. Alternatively, in the mounting adapter 12(12) depicted in FIGS. 11A-11C, at least one of the cable mounting surfaces 42, 46, 48 may comprise a flat surface 124. The concave rounded groove 122 may be customized for specific standard diameters of fiber optic cables 14, whereas the flat surface 124 may be best utilized to form attachments with the largest diameter fiber optic cables 14.

Figure 12A:
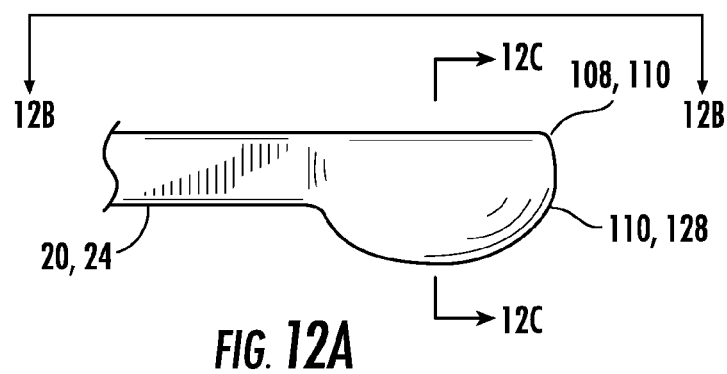
FIG. 12A depicts a side view of a distal end of another exemplary extension member that may be employed in a fiber optic cable mounting adapter, the first extension member including curved portions.
Figure 12B:
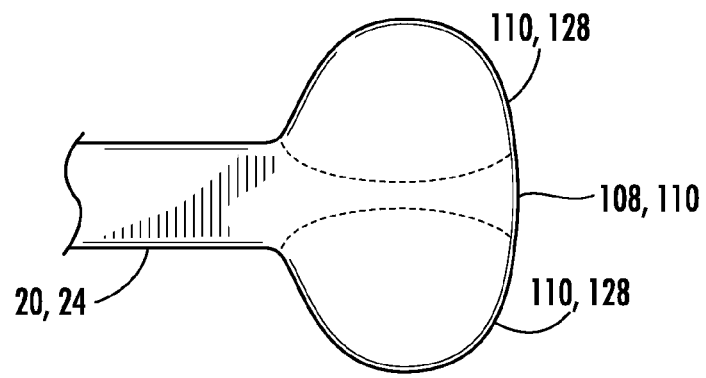
FIG. 12B depicts a top view of the distal end of the extension member of FIG. 12A.
Figure 12C:
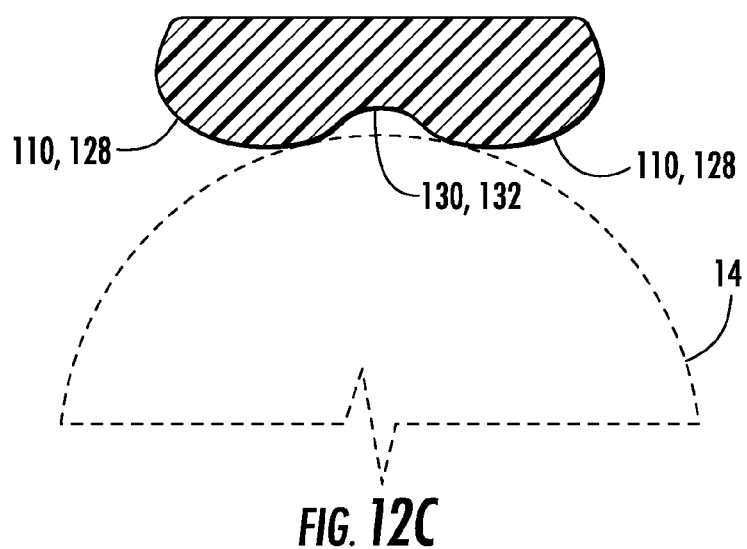
FIG. 12C depicts a cutaway view of the distal end of the extension member of FIG. 12A.

Another embodiment influencing surface contact between the first and second extension members 20, 24 and the fiber optic cable 14 and shown in FIGS. 12A-12C, are a plurality of first curved portions 126 and a plurality of second curved portions 128 disposed on the first and second extension members 20, 24 respectively. The purpose of the first and second curved portions 126, 128 are to provide additional contact support between the first and second extension members 20, 24 and the fiber optic cable 14 at one or more designated longitudinal positions of the first and second extension members 20, 24. For example, first and second curved portions 126, 128 may be provided at different positions along the first and second extension members 20, 24 to avoid abutting with first and second extension member fasteners 22, 26. Further, the first and second curved portions 126, 128 comprises a curved shape to better accommodate a broad range diameters of fiber optic cables 14. As shown in FIGS. 12A-12C, two of the plurality of first curved portions 126 are disposed at the distal end 108 of the first extension member 20 and connected by a first intertubercular groove 130. Similarly, FIGS. 12A-12C depict the plurality of second curved portions 138 being disposed at the distal end 110 of the second extension member 24 where the plurality of second curved portions 128 are connected by a second intertubercular groove 132. The first and second intertubercular grooves 130, 132 are adapted to abut the fiber optic cable 14, as depicted in FIG. 12C for example.

Figure 13A:
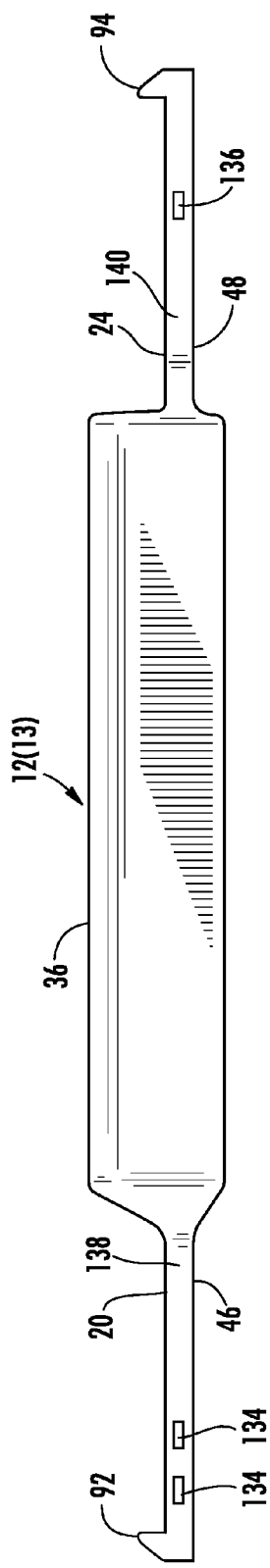
FIG. 13A depicts a side view of another exemplary fiber optic cable mounting adapter that includes one or more first extension member orifices and one or more second extension member orifices.
Figure 13B:
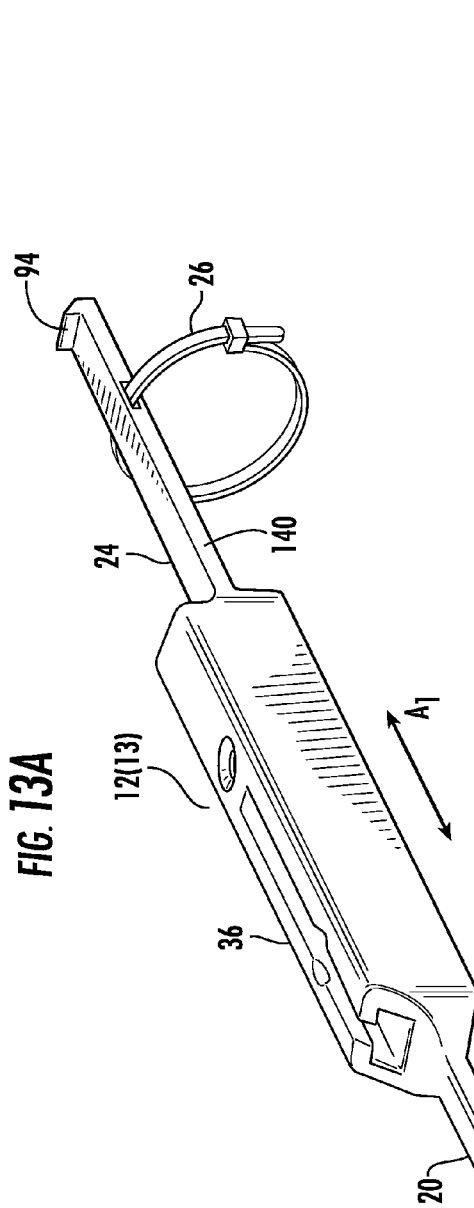
FIG. 13B depicts a perspective view of the fiber optic cable mounting adapter of FIG. 13A including first and second extension member fasteners to secure the fiber optic cable mounting adapter to a fiber optic cable.

Other methods can be provided to secure the mounting adapter 12 to the fiber optic cable 14. FIGS. 13A and 13B illustrate side and perspective views of the exemplary mounting adapter 12(13) that is similar to the mounting adapter 12 of FIGS. 1A and 1B. In this embodiment of the mounting adapters 12(13), the first and second extension members 20, 24 may include first and second extension orifices 134, 136. Common components between the mounting adapter 12(13) in FIGS. 13A and 13B and the mounting adapter 12 in FIGS. 1A and 1B are shown with common element numbers. In this different embodiment of securing the first and second extension members 20, 24 to the fiber optic cable 14 as shown in FIGS. 13A-13B, one or more first extension member orifices 134 may be disposed in the first extension member 20 and one or more second extension member orifices 136 may be disposed in the second extension member 24. In this embodiment, at least one of the first extension member fasteners 22 may be disposed circumferentially around the fiber optic cable 14 and through the one or more first extension member orifices 134, and at least one of the one or more second extension member fasteners 26 may be disposed circumferentially around the fiber optic cable 14 and through the one or more second extension member orifices 136. As further shown in FIGS. 13A-13B, the one or more first and second extension member orifices 134, 136 may be disposed through first and second side surfaces 138, 140 of the first and second extension members 20, 24 respectively. As shown again in FIGS. 13A-13B, these first and second side surfaces 138, 140 may be orthogonal to the first and second extension member cable mounting surfaces 46, 48 respectively. Further, the first and second extension member orifices 134, 136 may have a rectangular-shaped cross-section or other shape.

Moreover, the one or more first and second extension member fasteners 22, 26 may be cylindrically-shaped heat shrinks as depicted in FIGS. 1A-1B. Alternatively as shown in FIG. 13B, the one or more first and second extension member fasteners 22, 26 may be plastic ties, nylon ties, or zip/cable ties, for example, such as those produced by Leco Plastics, Inc. of Hackensack, N.J.

An advantage of the method embodiments enclosed may be that the mounting adapter 12 may be attached anywhere along the fiber optic cable 14 and a plurality of the mounting adapters 12 may be attached to the same fiber optic cable 14.

Many modifications and other embodiments set forth herein will come to mind to one skilled in the art to which the embodiments pertain having the benefit of the teachings presented in the foregoing descriptions and the associated drawings. For example, the embodiments herein can be applied to any type of cable and fiber optic cable. Any sizes of the features disclosed herein may be provided without limitation. For example, a broad range of fiber optic cables 14 having a wide variety of diameters may be used with one fiber optic cable mounting adapter 12 size. Further, various types of fasteners and associated fastener interfaces 56 may be used to secure the mounting body 36 to the external mounting structure 16 and the first and second extension members 20, 24 to the fiber optic cable 14.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic cable mounting adapter, comprising:
   a mounting body, comprising a first end, a second end opposite the first end, a cable mounting surface disposed longitudinally between the first end and second end, and a slot disposed longitudinally in the mounting body adjacent to the cable mounting surface configured to communicate with an external mounting structure;
   a first extension member extending from the first end of the mounting body and having a first extension member cable mounting surface;
   a second extension member extending from the second end of the mounting body and having a second extension member cable mounting surface;
   a first transition member disposed between the first end of the mounting body and a proximal end of the first extension member; and a second transition member disposed between the second end of the mounting body and a proximal end of the second extension member;

wherein at least one of:
- a width of the first transition member varies between the first end of the mounting body and the proximal end of the first extension member, and
- a width of the second transition member varies between the second end of the mounting body and the proximal end of the second extension member.

2. The fiber optic cable mounting adapter of claim 1, wherein the slot comprises an internal cavity between the first and second ends of the mounting body, and the slot further comprising an orifice in communication with the internal cavity at an end surface at the first end of the mounting body.

3. The fiber optic cable mounting adapter of claim 1, wherein the slot includes a T-shaped slot.

4. The fiber optic cable mounting adapter of claim 1, further comprising a first tapered portion disposed in the first transition member, and a second tapered portion disposed in the second transition member.

5. The fiber optic cable mounting adapter of claim 1, further comprising at least one flexure member disposed in the cable mounting surface of the mounting body between the first end of the mounting body and the second end of the mounting body.

6. The fiber optic cable mounting adapter of claim 1, further comprising one or more first protrusions disposed on the first extension member, and one or more second protrusions disposed on the second extension member.

7. The fiber optic cable mounting adapter of claim 1, wherein the cable mounting surface, the first extension member cable mounting surface, and the second extension member cable mounting surface each comprise surfaces comprised from the group consisting of a concave V-groove surface, a concave rounded surface, a flat surface.

8. A fiber optic cable mounting adapter, comprising:
a mounting body, comprising a first end, a second end opposite the first end, a cable mounting surface disposed longitudinally between the first end and second end, and a slot disposed longitudinally in the mounting body adjacent to the cable mounting surface configured to communicate with an external mounting structure;
a first extension member extending from the first end of the mounting body and having a first extension member cable mounting surface;
a second extension member extending from the second end of the mounting body and having a second extension member cable mounting surface;
one or more first protrusions disposed on the first extension member; and
one or more second protrusions disposed on the second extension member;
wherein at least one of the one or more first protrusions being disposed at a distal end of the first extension member, and at least one of the one or more second protrusions being disposed at a distal end of the second extension member.

9. A fiber optic cable mounting adapter, comprising:
a mounting body having a minimum width and comprising a first end, a second end opposite the first end, a cable mounting surface disposed longitudinally between the first end and the second end, and one or more fastener interfaces configured to communicate with an external mounting structure;
a first extension member having a first maximum width and extending from the first end of the mounting body and having a first extension cable mounting surface;
a second extension member having a second maximum width extending from the second end of the mounting body and having a second extension cable mounting surface, the first maximum width and second maximum width each being less than a minimum width of the mounting body; and
at least one flexure member disposed in the cable mounting surface of the mounting body between the first end of the mounting body and the second end of the mounting body.

10. The fiber optic cable mounting adapter of claim 9, wherein at least one of the first maximum width and the second maximum width being less than eighty (80) percent of the minimum width of the mounting body.

11. The fiber optic cable mounting adapter of claim 9, wherein the one or more fastener interfaces comprises a slot disposed longitudinally in the mounting body adjacent to the cable mounting surface and configured to communicate with the external mounting structure.

12. The fiber optic cable mounting adapter of claim 9, wherein the slot includes a T-shaped slot.

13. The fiber optic cable mounting adapter of claim 9, wherein the one or more fastener interfaces comprise one or more orifices configured to communicate with one or more fastener devices.

14. The fiber optic cable mounting adapter of claim 9, further comprising:
a first transition member disposed between the first end of the mounting body and a proximal end of the first extension member; and
a second transition member disposed between the second end of the mounting body and a proximal end of the second extension member.

15. The fiber optic cable mounting adapter of claim 14, further comprising a first tapered portion disposed in the first transition member, and a second tapered portion disposed in the second transition member.

16. The fiber optic cable mounting adapter of claim 9, further comprising one or more first protrusions disposed on the first extension member and one or more second protrusions disposed on the second extension member.

17. The fiber optic cable mounting adapter of claim 9, wherein the cable mounting surface, the first extension member cable mounting surface, and the second extension member cable mounting surface each comprise surfaces comprised from the group consisting of a concave V-groove surface, a concave rounded surface, a flat surface.

18. A fiber optic cable mounting adapter, comprising:
a mounting body having a minimum width and comprising a first end, a second end opposite the first end, a cable mounting surface disposed longitudinally between the first end and the second end, and one or more fastener interfaces configured to communicate with an external mounting structure;
a first extension member having a first maximum width and extending from the first end of the mounting body and having a first extension cable mounting surface;
a second extension member having a second maximum width extending from the second end of the mounting body and having a second extension cable mounting surface, the first maximum width and second maximum width each being less than a minimum width of the mounting body;

one or more first protrusions disposed on the first extension member; and one or more second protrusions disposed on the second extension member;

wherein at least one of the one or more first protrusions being disposed at a distal end of the first extension member, and at least one of the one or more second protrusions being disposed at a distal end of the second extension member.

19. A fiber optic cable assembly, comprising:
a fiber optic cable; and
a mounting adapter, comprising:
   a mounting body having a minimum width and comprising a first end, a second end opposite the first end, a cable mounting surface disposed longitudinally between the first end and the second end, and one or more fastener interfaces configured to receive an external mounting structure,
   a first extension member extending from the first end of the mounting body and having a first extension member cable mounting surface,
   a second extension member extending from the second end of the mounting body and having a second extension member cable mounting surface,
   a first transition member disposed between the first end of the mounting body and a proximal end of the first extension member,
   a second transition member disposed between the second end of the mounting body and a proximal end of the second extension member,
   one or more first extension member fasteners securing the first extension member to the fiber optic cable, and
   one or more second extension member fasteners securing the second extension member to the fiber optic cable.

20. The fiber optic cable assembly of claim 19, wherein
the first extension member having a first maximum width; and
a second extension member having a second maximum width, the first maximum width and second maximum width each being less than a minimum width of the mounting body.

21. The fiber optic cable assembly of claim 19, further comprising a slot disposed longitudinally in the mounting body adjacent to the cable mounting surface and configured to receive an external mounting structure.

22. The fiber optic cable assembly of claim 19, wherein the one or more first extension member fasteners comprise one or more first heat shrinks, and the one or more second extension member fasteners comprise one or more second heat shrinks.

23. The fiber optic cable assembly of claim 19, wherein at least one of the one or more first extension member fasteners encircles both the fiber optic cable and the first extension member and at least one of the one or more second extension member fasteners encircles both the fiber optic cable and the second extension member.

24. The fiber optic cable assembly of claim 19, further comprising adhesive disposed between at least one of the first extension member fasteners and first extension member and between at least one of the second extension member fasteners and the second extension member.

25. The fiber optic cable assembly of claim 19, wherein at least one of the one or more first extension member fasteners comprises ties.

26. The fiber optic cable assembly of claim 19, further comprising:
   one or more first extension member orifices disposed in the first extension member; and
   one or more second extension member orifices disposed in the second extension member,
   wherein at least one of the one or more first extension member fasteners being disposed circumferentially around the fiber optic cable and through the one or more first extension member orifices, and
   at least one of the one or more second extension member fasteners being disposed circumferentially around the fiber optic cable and through the one or more second extension member orifices.

27. A method for assembling a fiber optic cable assembly, comprising:
   placing a cable mounting surface of a mounting adapter, a first extension member cable mounting surface, and a second extension member cable mounting surface in abutment with a fiber optic cable as to align the mounting adapter with a longitudinal axis of the fiber optic cable;
   securing a first extension member of the mounting adapter to the fiber optic cable with one or more first extension member fasteners;
   securing a second extension member of the mounting adapter to the fiber optic cable with one or more second extension member fasteners; and
   securing a mounting body of the mounting adapter to an external mounting structure using one or more fastener interfaces of the mounting adapter,
   wherein at least one of a maximum width of the first and the second extension members being less than a minimum width of the mounting body;
   wherein prior to securing a first extension member of the mounting adapter to the fiber optic cable, the method further comprises:
      disposing the one or more first extension member fasteners through one or more first extension member orifices orientated in the first extension member, and
      disposing the one or more second extension member fasteners through one or more second extension member orifices orientated in the second extension member.

28. The method of claim 27, wherein in the securing the mounting body of the mounting adapter to the external mounting structure includes the fastener interface being a slot disposed longitudinally and adjacent to the cable mounting surface.

29. A method for assembling a fiber optic cable assembly, comprising:
   placing a cable mounting surface of a mounting adapter, a first extension member cable mounting surface, and a second extension member cable mounting surface in abutment with a fiber optic cable as to align the mounting adapter with a longitudinal axis of the fiber optic cable;
   securing a first extension member of the mounting adapter to the fiber optic cable with one or more first extension member fasteners;
   securing a second extension member of the mounting adapter to the fiber optic cable with one or more second extension member fasteners; and
   securing a mounting body of the mounting adapter to an external mounting structure using one or more fastener interfaces of the mounting adapter, wherein at least one of a maximum width of the first and the second extension members being less than a minimum width of the mounting body, wherein prior to securing a first extension member of the mounting adapter to the fiber optic cable, the method further comprises disposing a first extension member fastener around both the first extension member and the fiber optic cable, and adjacent to a first protrusion disposed on the first extension member; and wherein prior to securing a second extension member of the mounting adapter to the fiber optic cable, the method further comprises disposing a second extension member fastener around both the second extension member and the fiber optic cable, and adjacent to a second protrusion disposed on the second extension member.

30. The method of claim 29, wherein the one or more first extension member fasteners being one or more heat shrinks and the one or more second extension member fasteners being one or more heat shrinks.

* * * * *